United States Patent [19]

Kaneshige et al.

[11] Patent Number: 5,655,917
[45] Date of Patent: Aug. 12, 1997

[54] CONNECTOR FOR MINIATURE CIRCUIT CARD

[75] Inventors: Akira Kaneshige, Musashino; Junichi Miyazawa, Yokohama; Shigeru Akiyama, Machida; Masato Yamaguchi; Kazuhiro Enokido, both of Yokohama, all of Japan

[73] Assignee: Molex Incorporated, Lisle, Ill.

[21] Appl. No.: 432,862

[22] Filed: May 2, 1995

[30] Foreign Application Priority Data

Dec. 28, 1994 [JP] Japan .................... 6-338971

[51] Int. Cl.⁶ ............................................ H01R 13/62
[52] U.S. Cl. .................. 439/155; 439/352; 439/928.1
[58] Field of Search ........................ 439/153, 159–60, 439/155, 152, 928.1

[56] References Cited

U.S. PATENT DOCUMENTS

| | | | |
|---|---|---|---|
| 4,926,032 | 5/1990 | Shimamura et al. | 235/441 |
| 5,028,767 | 7/1991 | Mizuno | 439/153 |
| 5,139,435 | 8/1992 | Komatsu et al. | 439/159 |
| 5,252,815 | 10/1993 | Pernet | 235/441 |
| 5,299,946 | 4/1994 | Kusakabe | 439/159 |
| 5,398,164 | 3/1995 | Goodman et al. | 439/153 |
| 5,503,564 | 4/1996 | Futatsugi et al. | 439/153 |
| 5,518,410 | 5/1996 | Masami | 439/71 |

*Primary Examiner*—Neil Abrams
*Assistant Examiner*—Eugene G. Byrd
*Attorney, Agent, or Firm*—Stacey E. Caldwell

[57] ABSTRACT

A card-receiving connector system for a miniature circuit card. A card holder receives a card, and a frame is adapted for locating the card holder in an operative position thereon and includes spring contacts mounted therein for engagement with electronic circuitry on the card. Complementary interengaging latches are provided between the frame and the card holder for holding the card holder in the operative position. An eject mechanism is mounted on the frame for ejecting the card holder from its operative position. An unlatching mechanism is operatively associated with the eject mechanism for unlatching the interengaging latches in response to movement of the eject mechanism. Lost motion is built into the eject mechanism to permit unlatching of the latches prior to ejecting the card holder from its operative position.

16 Claims, 3 Drawing Sheets

CONNECTOR FOR MINIATURE CIRCUIT CARD

FIELD OF THE INVENTION

This invention generally relates to a card-receiving connector for a card containing an electronic circuit.

BACKGROUND OF THE INVENTION

Integrated circuit (IC) cards are used in a variety of applications in conjunction with a card reader. The card reader usually is in the form of a card-receiving connector mounted on a printed circuit board. The card is inserted into the connector, and the connector includes a housing having conductive terminals mounted therein such that spring contact portions of the terminals bear against circuit pads on the card to make electrical connections. When the card is accurately positioned in the connector, the spring contacts transmit electronic information from the card to the circuitry of the printed circuit board which, in turn, can be a subsystem of a larger information system.

One type of IC card of the character described above is commonly termed a "subscriber's identification module" or SIM card. A SIM card is a miniature chip card for use in small hand-held devices such as pocket size cellular telephones. The SIM card may provide information such as user identification in individual telephone handsets. SIM card readers or connectors have been developed to accommodate insertion and removal of the SIM card and to provide quick identification and easy access by a cellular telephone user.

A typical SIM card includes electronic circuitry thereon for performing the specific function for which it is intended. The circuitry includes exposed circuit pads for mating to underlying spring contacts in the SIM card reader. The card is typically lowered onto the spring contacts from above the card reader and removed manually therefrom, thereby exposing the underlying spring contacts and rendering them susceptible to contaminants or damage, which can eventually compromise the reliability and integrity of the electrical connection between the SIM card circuit pads and the underlying spring contacts of the card reader. Another consequence of the manual insertion and removal of a SIM card is that a user or subscriber cannot always assure that the SIM card is fully and accurately inserted, and attempts to operate the underlying system, such as a phone for example, when the card is improperly positioned is futile. Furthermore, the small and fragile SIM card can be damaged when improperly inserted since it is constantly subjected to human handling and extraneous forces. Lastly, without means for locking the card within a connector, a user can inadvertently or unintentionally remove the SIM card during processing or use of the card. The present invention is directed to solving these various interrelated problems.

SUMMARY OF THE INVENTION

An object, therefore, of the invention is to provide a new and improved card-receiving connector system, such as a SIM card and card reader of the character described.

In the exemplary embodiment of the invention, the SIM card is mounted in a holder and the card-receiving connector includes a frame adapted for locating the card holder in an operative position thereon whereat contacts mounted within the frame are in engagement with electronic circuitry of the card. Complementary interengaging latches are provided between the frame and the card holder for holding the card holder in the operative position. An eject mechanism is movably mounted on the frame for ejecting the card holder from its operative position. Unlatching means are operatively associated with the eject mechanism for unlatching the latches in response to movement of the eject mechanism.

As disclosed herein, the complementary interengaging latches comprise a flexible latch arm on the frame engageable with a latch boss on the card holder when the card holder is in its operative position. The frame is molded of plastic material and the latch arm is integral therewith and cantilevered therefrom, with a latch arm boss on a distal end of the arm engageable with the latch boss on the card holder. A portion of the eject mechanism is effective to engage and bias the flexible latch arm out of the path of the latch boss on the card holder so that the card holder is unlatched and can be removed from the connector.

Generally, the eject mechanism includes lost motion means effective to permit unlatching of the latches prior to ejecting the card holder from its operative position. In particular, the eject mechanism includes an eject member and an actuator member with the unlatching portion thereon. The actuator is mounted for linear movement on the frame and the eject member is mounted for rotational movement on the frame, with the actuator being spaced from the eject member in an unactuated position to provide the lost motion means.

Other features of the invention include secondary latches for holding the actuator in an actuated position in the absence of the card holder being located in the connector. On/off contacts are provided on the frame, and corresponding circuitry on the card holder allows for closing the on/off contacts in response to locating the card holder in its operative position.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
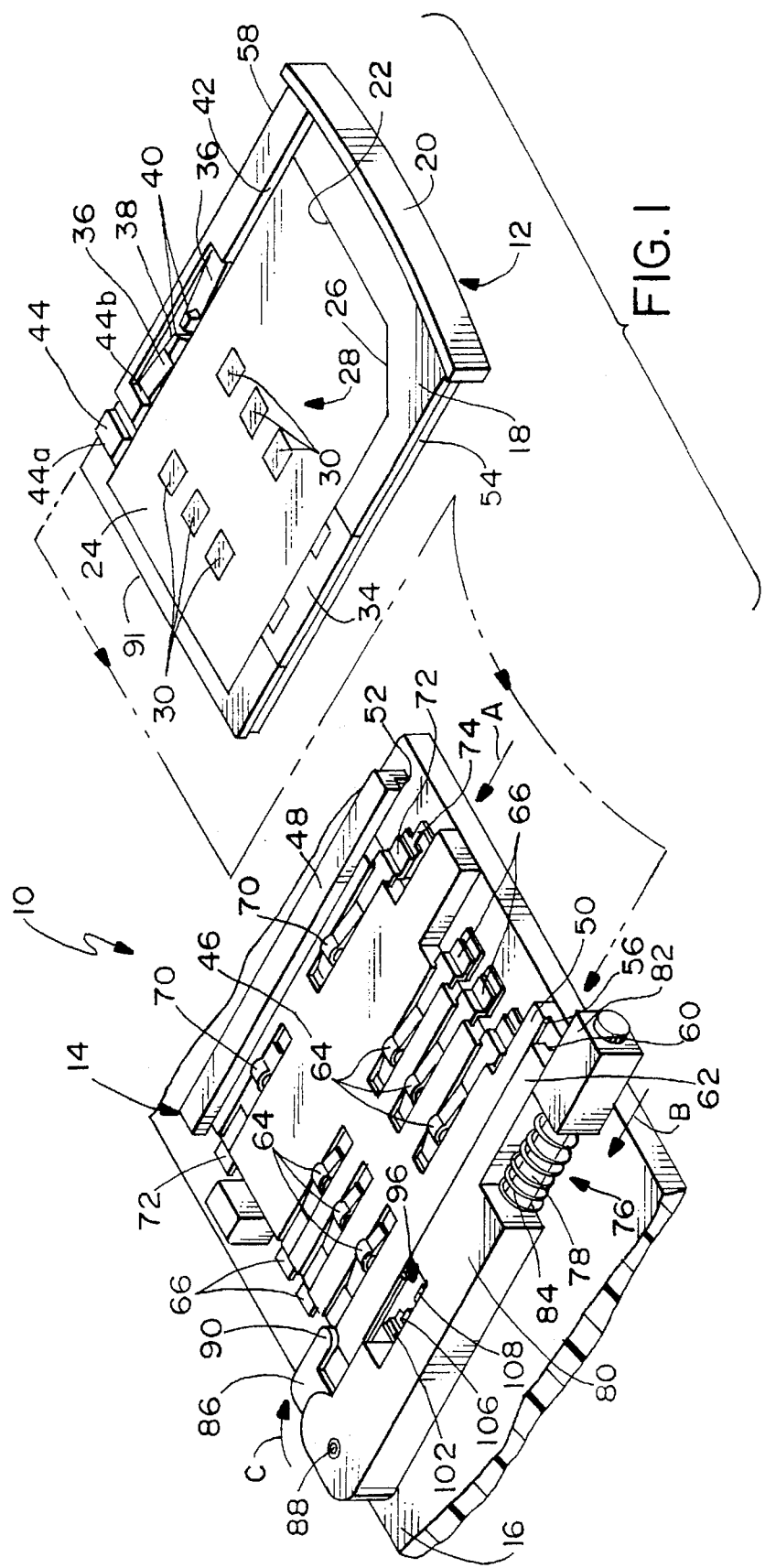
FIG. 1 is an exploded perspective view of the connector system of the invention, including the connector and the SIM card within its holder.

Referring to the drawings in greater detail, and first to FIG. 1, the invention is embodied in a connector system, generally designated 10, for a "subscriber's identification module" (SIM), generally designated 12. The SIM is insertable into a card-receiving connector, generally designated 14, in the direction of arrow "A". The connector is mounted on a printed circuit board 16. The SIM is shown bottom-side-up in FIG. 1, whereupon the SIM must be flipped over from the position shown in FIG. 1 before insertion into the connector.

As described in the "Background", above, SIM 12 can be used in small devices such as pocket size cellular telephones. For instance, the SIM may provide user identification in individual cellular telephone handsets.

More specifically, SIM 12 includes a generally planar holder 18 having a front push-pull flange 20 for grasping by a user. Card holder 18 has a recessed area 22 on the bottom side thereof for receiving a miniature chip or card 24. The recessed area and chip may have a flattened corner, as at 26, to provide a keying means whereby the chip or card can be positioned within the recessed area in only one orientation. The card has electronic circuitry, generally designated 28, imprinted thereon. The circuitry includes six circuit pads 30 joined by a appropriate circuit traces (not shown), for purposes described hereinafter. An elongated on/off contact 34 is embedded within one edge of card holder 18, again for purposes described hereinafter. The opposite edge of card holder 18 includes a pair of cantilevered spring arms 36 spaced inwardly of a side wall 38 of the holder which have camming tabs 40 on the distal ends thereof. The camming tabs hold card 24 within recess 22 by exerting a force against an edge of the card. A flange 42 runs along the edge of card holder 18. Lastly, a latch boss 44 is also formed along the edge of card holder 18, with the latch boss having a chamfered leading edge 44a and an abrupt trailing edge or latch shoulder 44b.

Figure 2:
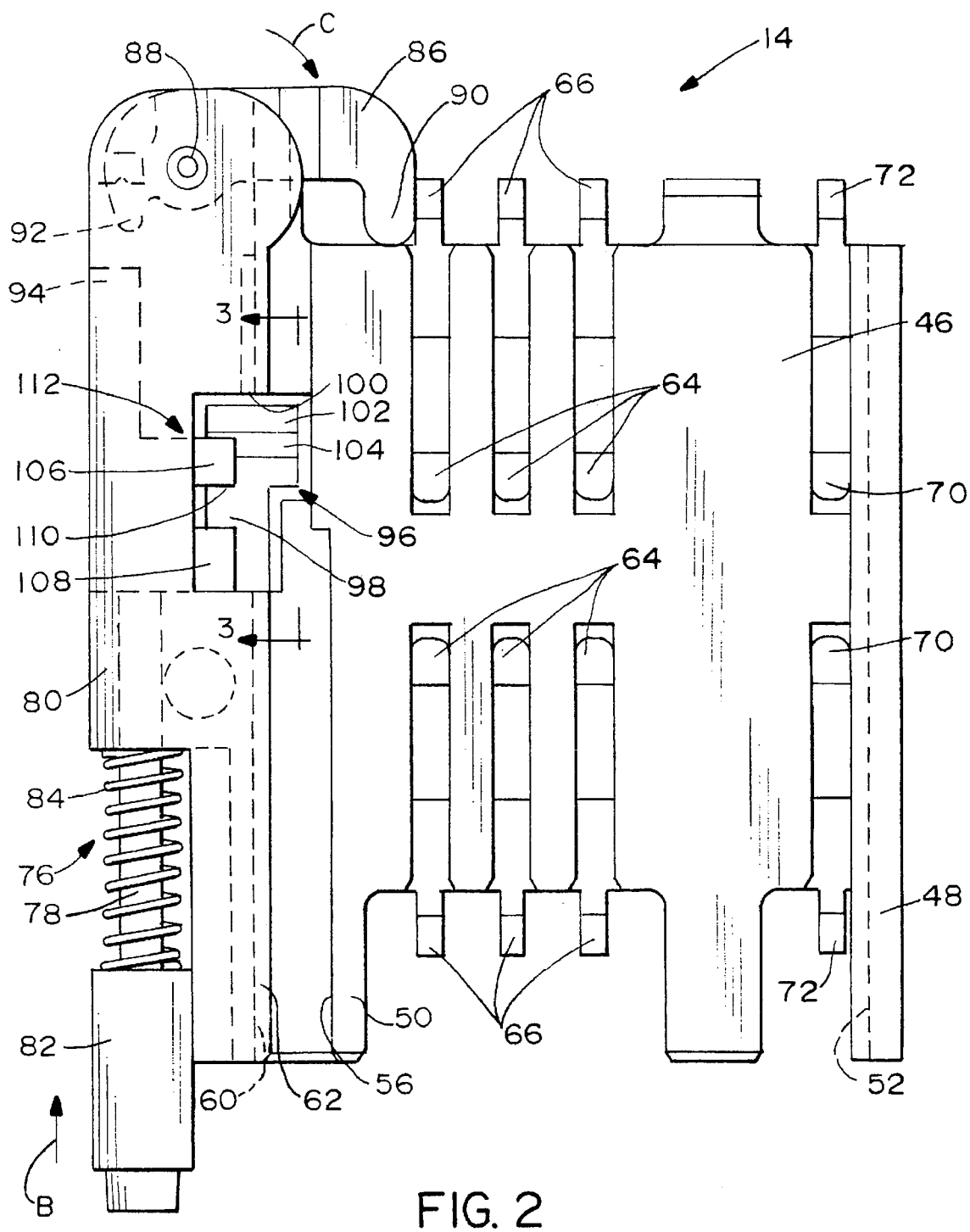
FIG. 2 is a top plan view of the connector.

Referring to FIG. 2 in conjunction with FIG. 1, connector 14 includes a generally planar frame 46 having a flange 48 running along one side thereof and a flange 50 running along the opposite side thereof. Flange 48 has an inwardly directed channel 52 for receiving edge 54 (FIG. 1) of SIM card holder 18. Flange 50 has an outwardly directed channel 56 for receiving flange 42 of card holder 18. An outside edge 58 of the card holder rides within a channel 60 of a third flange 62 of connector frame 46. Therefore, SIM 12 is inserted into connector 14 in the direction of arrow "A" with edge 54 of the card holder riding in channel 52 of flange 48 of the connector frame, and edge 58 of the card holder riding within channels 56 and 60 of flanges 50 and 62, respectively, of the connector frame.

Still referring to FIGS. 1 and 2, six cantilevered spring contacts 64 project upwardly from planar frame 46 for engagement by circuit pads 30 of card 24. Since the card is inserted in a sliding movement into the connector frame, a wiping action is formed between the circuit pads and the spring contacts to remove contaminants therefrom. The spring contacts have tail portions 66 for connection to circuit traces (not shown) on printed circuit board 16.

A pair of spaced on/off spring switch contacts 70 also are mounted within connector 14 and project upwardly from planar frame 46 for engagement by the corresponding elongated on/off contact 34 on card holder 18. Contacts 70 have tail portions 72 for engaging circuit traces on printed circuit board 16. Therefore, when SIM 12 is properly inserted into connector 14, contact 34 on the card holder spans and interconnects on/off switch contacts 70 on the connector to "close" the contacts and establish an electrical circuit therethrough. This on/off switch arrangement allows for deactivating the system circuitry when the SIM is removed from the connector.

An eject mechanism, generally designated 76, is mounted on the connector frame for ejecting SIM 12 from its operative position. The eject mechanism includes an actuator rod 78 linearly movable within an enlarged portion 80 of the connector frame and has a push-button 82 on the outer or distal end of the rod. A coil spring 84 surrounds the rod and is biased between push-button 82 and the enlarged portion 80 of the connector frame to bias the push-button and actuator rod outwardly.

Eject mechanism 76 further includes an eject lever 86 pivotally mounted on the connector frame, as at 88. The eject lever has an ejecting finger 90 engageable with a forward edge 91 (FIG. 1) of card holder 18 to effect ejection of the holder from connector 14, as described hereinafter. The eject lever has an engaging tab 92 on the side of eject lever 86 opposite ejecting finger 90. Engaging tab 92 is engageable by an inner extension 94 of actuator rod 78. It should be noted in FIG. 2, that actuator rod 78 and eject lever 86 are in their static or inoperative positions. In this condition, it should be noted that inner extension 94 of the actuator rod is spaced from engaging tab 92 of the eject lever. This spacing provides a lost motion means which requires the actuator rod to travel a given distance in the direction of arrow "B" before engaging the eject lever which then will be pivoted in the direction of arrow "C" to effect ejection of the SIM opposite the direction of arrow "A".

Generally, complementary interengaging latch means, generally designated 96, are provided between connector 14 and SIM 12 for holding the SIM in its insertion position. Latch boss 44 of card holder 18 forms part of the latch means.

More particularly, connector frame 46 is unitarily molded of plastic material or the like, and an integral cantilevered latch arm 98 is formed out of an opening 100 in the frame as best seen in FIG. 2. The latch arm has a latch arm boss 102 for interengagement with latch boss 44 on card holder 18.

Figure 3:
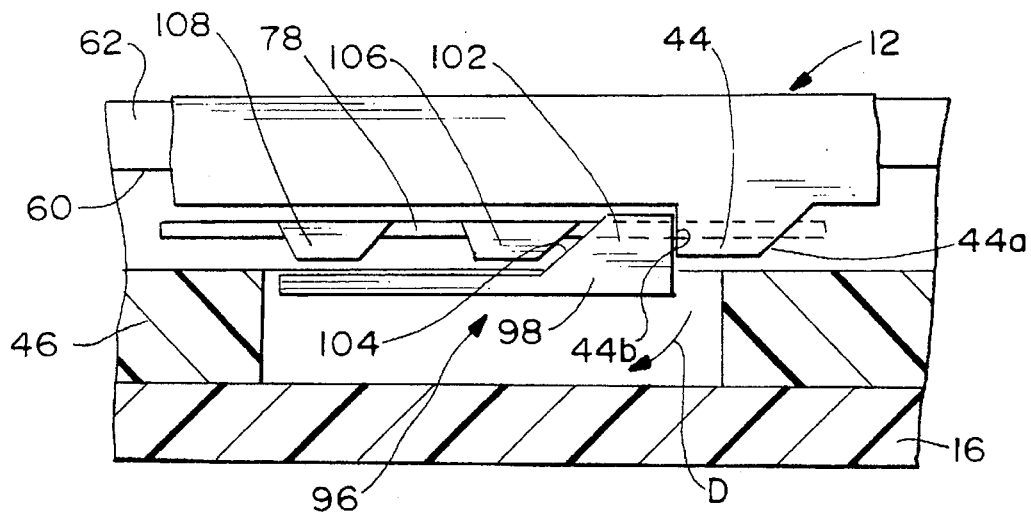
FIG. 3 is a fragmented vertical section, on an enlarged scale, taken generally along line 3—3 of FIG. 2, but with the SIM card holder in its operative position.

Referring to FIG. 3 in conjunction with FIGS. 1 and 2, latch shoulder 44b of latch boss 44 on holder 18 is shown in latched condition, in engagement with latch arm boss 102 on the distal end of cantilevered latch arm 98. When SIM 12 is inserted into the connector, chamfered leading edge 44a (FIGS. 1 and 3) of latch boss 44 engages a chamfered front surface 104 on latch arm boss 102 and biases the latch arm downwardly in the direction of arrow "D" until the latch bosses lockingly interengage as seen in FIG. 3.

Figure 4:
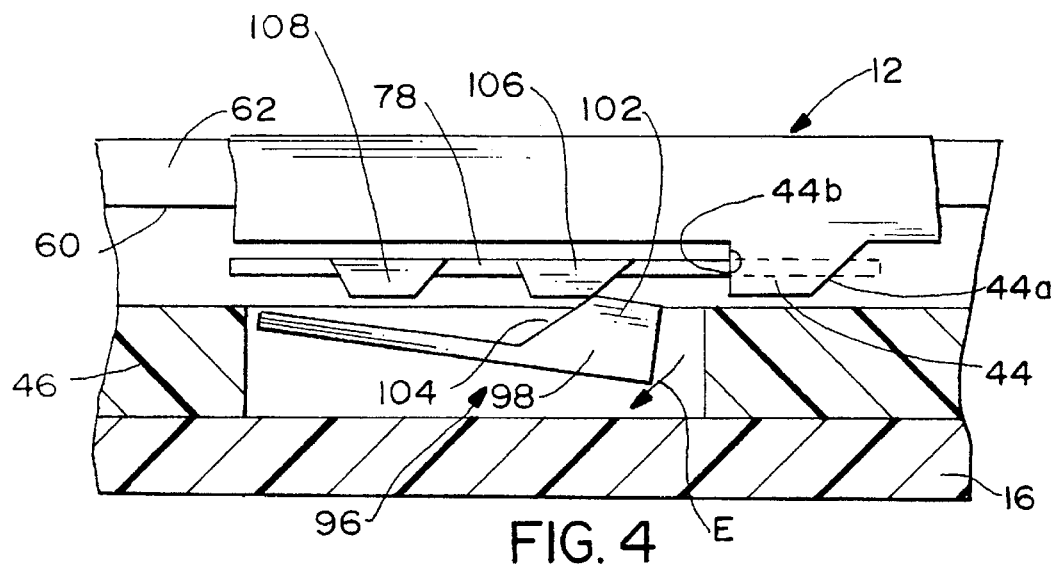
FIG. 4 is a view similar to that of FIG. 3, but showing the actuator depressing the latch arm to unlatch the card holder and allow removal therefrom.

In order to unlatch latch means 96, actuator rod 78 of eject mechanism 76 is moved linearly inwardly by pushing on push-button 82 in the direction of arrow "B" (FIGS. 1 and 2). A unlatching boss 106 is operatively associated with and movable with actuator rod 78 of eject mechanism 76 for engaging and unlatching a secondary latch arm boss 102 on latch arm 98, as best seen in FIG. 2. Referring to FIG. 4 in conjunction with FIG. 2, and comparing FIG. 4 with FIG. 3, it can be seen that unlatching boss 106 on actuator rod 78 has engaged latch arm boss 102 on latch arm 98 to bias the latch arm downwardly in the direction of arrow "E". It can be seen that latch arm boss 102 on the latch arm now has cleared latch boss 44 on card holder 18 whereupon the SIM can be removed from connector 14. After unlatching latch boss 44 from latch arm boss 102, the SIM can be removed either manually by pulling on front flange 20 of the card holder, or actuator rod 78 further can be pushed inwardly to actuate eject lever 86 to mechanically eject the SIM from its insertion position. A secondary unlatching boss 108, spaced from the first latching boss 106 along actuator rod 78 biases the latch arm downwardly during this ejection.

As stated above, lost motion means are provided within eject mechanism 76 by the spacing between inner extension 94 (FIG. 2) of actuator rod 78 and engaging tab 92 of eject lever 86. This spacing effectively permits unlatching of latch means 96 prior to mechanically ejecting the SIM from its insertion position. In other words, the initial "lost" movement of the actuator rod effects the unlatching action as described above in relation to FIG. 4. Once latch bosses 102 and 44 are unlatched as described, the actuator rod then sequentially engages the eject lever to mechanically eject the SIM from its insertion position.

Figure 5:
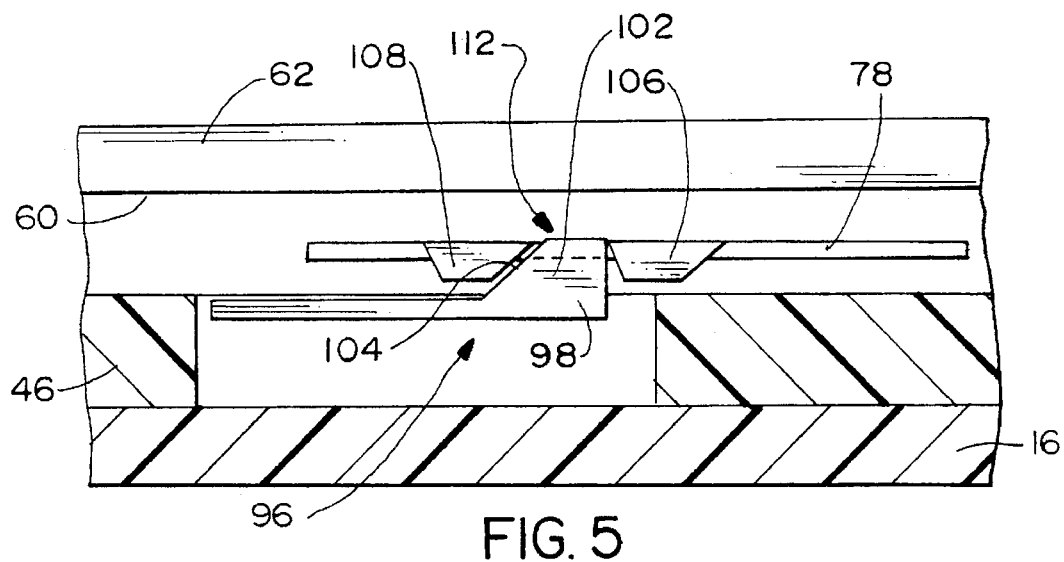
FIG. 5 is a view similar to that of FIG. 3, but with the card holder removed and the actuator in its latched condition.

Lastly, as illustrated most clearly in FIG. 5, secondary latch means 112 are provided between actuator rod 78 and push-button 82 for holding the push rod in an actuated position in the absence of SIM 12 being located in connector 14. This secondary latch means is provided for shipping and handling purposes so that push-button 82 does not project from the connector an excess amount which could cause the push-button to catch on extraneous objects and cause damage to the connector. More particularly, as best seen in FIG. 2, a space 110, associated with the actuator rod, is provided between unlatching boss 106 and unlatching boss 108. When the rod is pushed inwardly in the direction of arrow "B", unlatching boss 106 can pass over latch arm boss 102 on latch arm 98 and lock therebehind by way of the space, thereby maintaining the actuator rod and push-button in an inner position so that the push-button does not project excessively out of the connector frame. When it is desired to "activate" the eject mechanism, a user simply presses down on latch arm 98 to release unlatching boss 106 from behind boss 102, whereupon spring 84 biases the actuator rod and push-button outwardly to its normal operative condition, as shown in FIGS. 1 and 2.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A two-piece card-receiving connector system for a miniature circuit card comprising:

a card holder for receiving and holding the card therein;

a connector frame adapted for locating the card holder in an operative position on the frame and having spring contacts mounted therein projecting upwardly for engagement with electronic circuitry on a surface of the card;

complementary interengaging latch means between the frame and the card holder for holding the card holder in its operative position;

an eject mechanism movably mounted on the frame for ejecting the card holder from said operative position, the eject mechanism including an actuator member mounted for linear movement relative to the connector frame and an eject member mounted for rotational movement relative to the connector frame; and unlatching means associated with the eject mechanism for unlatching the latch means in response to movement of the eject mechanism.

2. The connector system of claim 1 wherein said eject mechanism further includes lost motion means effective to permit unlatching of the latch means prior to ejecting the card holder from said operative position.

3. The connector system of claim 2 wherein said eject mechanism includes an unlatching portion and wherein said lost motion means is between said unlatching portion and said eject member.

4. The connector system of claim 3 wherein said actuator member includes said unlatching portion mounted thereon.

5. The connector system of claim 4 wherein the actuator member is spaced from the eject member in an unactuated position to provide said lost motion means.

6. The connector system of claim 1 wherein said complementary interengaging latch means include a flexible latch arm on the frame engageable with a latch boss on the card holder when the card holder is in said operative position.

7. The connector system of claim 6 wherein said frame is molded of plastic material and the latch arm is integral therewith and cantilevered therefrom with a latch arm boss of a distal end of the arm engageable with the latch boss on the card holder.

8. The connector system of claim 1 including secondary latch means for holding the actuator member in an actuated position in the absence of the card holder being located in the operative position.

9. The connector system of claim 8 wherein said secondary latch means at least in part comprises a portion of said complementary interengaging latch means.

10. The connector system of claim 1, including on/off contact means on the frame and corresponding circuit means on the card holder to close the contact means in response to locating the card holder in said operative position.

11. A card-receiving connector system comprising:

a card holder for said card;

a frame adapted for receiving the card holder in an operative position and including spring contacts mounted therein for engagement with electronic circuitry on the card;

a flexible latch arm integrally formed on the frame;

a latch boss on said card holder interengageable with the flexible latch arm when the card holder is in said operative position; and an eject mechanism mounted on the frame for ejecting the card holder from said operative position, the eject mechanism including an actuator member mounted for linear movement relative to the connector frame, and an eject member mounted for rotational movement relative to the connector frame and spaced from the actuator member, the actuator member including an unlatching portion for moving the flexible latch arm out of latching engagement with the latch boss on the card holder.

12. The connector system of claim 11, wherein the spacing between the actuator member and the eject member provides a lost motion means therebetween for permitting unlatching of the latch arm and latch boss prior to ejecting the card holder from its operative position.

13. The connector system of claim 11 wherein said frame is molded of plastic material and the latch arm is integral therewith and cantilevered therefrom with a latch arm boss on a distal end of the arm engageable with the latch boss on the card holder.

14. The connector system of claim 11, including secondary latch means for holding the actuator member in an actuated position in the absence of the card holder being in said operative position.

15. The connector system of claim 11 wherein said secondary latch means in part comprises a portion of said flexible latch arm.

16. The connector system of claim 11, including on/off contact means on the frame and corresponding circuitry on the card holder to close the contact means in response to locating the card holder in said operative position.

* * * * *

UNITED STATES PATENT AND TRADEMARK OFFICE
CERTIFICATE OF CORRECTION

PATENT NO. : 5,655,917
DATED : August 12, 1997
INVENTOR(S) : Akira Kaneshige et al.

It is certified that error appears in the above-indentified patent and that said Letters Patent is hereby corrected as shown below:

Title page, change:

Assignee: Molex Incorporated, Lisle, Ill.

to

Assignee: Molex Incorporated, Lisle, Ill., Sony Corporation, Tokyo, Japan

Signed and Sealed this

Seventh Day of July, 1998

Attest:

BRUCE LEHMAN

Attesting Officer

Commissioner of Patents and Trademarks